United States Patent
Yi et al.

(10) Patent No.: US 10,033,510 B2
(45) Date of Patent: Jul. 24, 2018

(54) METHOD AND APPARATUS FOR AGGREGATION OF FREQUENCY DIVISION DUPLEX AND TIME DIVISION DUPLEX

(71) Applicant: LG ELECTRONICS INC., Seoul (KR)

(72) Inventors: Yunjung Yi, Seoul (KR); Joonkui Ahn, Seoul (KR); Dongyoun Seo, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 203 days.

(21) Appl. No.: 14/916,556

(22) PCT Filed: Sep. 4, 2014

(86) PCT No.: PCT/KR2014/008345
§ 371 (c)(1),
(2) Date: Mar. 3, 2016

(87) PCT Pub. No.: WO2015/034301
PCT Pub. Date: Mar. 12, 2015

(65) Prior Publication Data
US 2016/0204927 A1    Jul. 14, 2016

Related U.S. Application Data

(60) Provisional application No. 61/873,803, filed on Sep. 4, 2013.

(51) Int. Cl.
*H04J 3/00* (2006.01)
*H04L 5/14* (2006.01)
(Continued)

(52) U.S. Cl.
CPC ............. *H04L 5/14* (2013.01); *H04B 7/2615* (2013.01); *H04L 5/001* (2013.01);
(Continued)

(58) Field of Classification Search
CPC ......... H04L 5/14; H04L 5/001; H04L 5/0048; H04L 27/2646; H04L 5/0045; H04L 5/0055; H04W 56/0045; H04B 7/2615
See application file for complete search history.

(56) References Cited

U.S. PATENT DOCUMENTS 9,572,153 B2 * 2/2017 Li ............................ H04L 5/00
2010/0165893 A1   7/2010 Edwards
(Continued)

FOREIGN PATENT DOCUMENTS

| CN | 102187725 | 9/2011 |
| CN | 103037527 | 4/2013 |
| WO | 2010/035100 A1 | 4/2010 |

OTHER PUBLICATIONS

PCT International Application No. PCT/KR2014/008345, International Search Report dated Dec. 11, 2014, 1 page.
(Continued)

*Primary Examiner* — Charles C Jiang
*Assistant Examiner* — Ryan Kavleski
(74) *Attorney, Agent, or Firm* — Lee Hong Degerman Kang & Waimey

(57) ABSTRACT

This application related to method and apparatus for aggregation of frequency division duplex and time division duplex. One embodiment of method comprises receiving signals from a cell configured with FDD and/or a cell configured with TDD according to the downlink scheduling, adjusting timing of uplink transmissions for the cells configured with FDD or the cell configured with TDD when the UE detects timing difference between the cells, and transmitting uplink signal to the cell configured and/or a cell configured with TDD based on the adjusted timing.

12 Claims, 16 Drawing Sheets

(51) Int. Cl.
  *H04B 7/26* (2006.01)
  *H04L 5/00* (2006.01)
  *H04L 27/26* (2006.01)
  *H04W 56/00* (2009.01)
(52) U.S. Cl.
  CPC ..... *H04L 27/2646* (2013.01); *H04W 56/0045* (2013.01); *H04L 5/0048* (2013.01); *H04L 5/0055* (2013.01)

(56) References Cited

U.S. PATENT DOCUMENTS

| | | | |
|---|---|---|---|
| 2012/0120821 A1 | 5/2012 | Kazmi et al. | |
| 2012/0263079 A1 | 10/2012 | Struhsaker | |
| 2012/0275390 A1* | 11/2012 | Korhonen | H04W 74/006 370/329 |
| 2013/0201911 A1 | 8/2013 | Bergstrom et al. | |
| 2014/0010139 A1* | 1/2014 | Choi | H04W 4/06 370/312 |
| 2014/0161002 A1* | 6/2014 | Gauvreau | H04W 16/24 370/280 |
| 2014/0241225 A1* | 8/2014 | Novak | H04W 72/02 370/311 |
| 2016/0164622 A1* | 6/2016 | Yi | H04B 7/2656 370/280 |
| 2016/0219547 A1* | 7/2016 | Seo | H04W 56/0045 |

OTHER PUBLICATIONS

State Intellectual Property Office of the People's Republic of China Application Serial No. 201480048568.9, Office Action dated Feb. 28, 2018, 6 pages.

\* cited by examiner

MeNB 1

HeNB 1

HeNB 2

HeNB 3

HeNB 4

MeNB 2

MeNB 1

HeNB 1

HeNB 2

HeNB 3

HeNB 4

MeNB 2

METHOD AND APPARATUS FOR AGGREGATION OF FREQUENCY DIVISION DUPLEX AND TIME DIVISION DUPLEX

CROSS-REFERENCE TO RELATED APPLICATIONS

This application is the National Stage filing under 35 U.S.C. 371 of International Application No. PCT/KR2014/008345, filed on Sep. 4, 2014, which claims the benefit of U.S. Provisional Application No. 61/873,803, filed on Sep. 4, 2013, the contents of which are all hereby incorporated by reference herein in their entirety.

TECHNICAL FIELD

This application is related to method and apparatus for uplink transmission, specifically related to uplink transmission for a user equipment configured with frequency division multiplexing carriers and time division multiplexing carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology or resource aggregation over intra-node carriers or inter-node carriers aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). For inter-node resource aggregation, for each node, carrier group (CG) can be established where one CG can have multiple CCs. Each CC is defined by a single bandwidth and a center frequency.

A system in which data is transmitted and/or received in a broadband through a plurality of CCs is referred to as a multi-component carrier system (multi-CC system) or a CA environment. A system in which data is transmitted and/or received in a broadband through a plurality of CGs is referred to as a inter-node resource aggregation or dual connectivity environment. The multi-component carrier system and dual connectivity system perform both a narrow band and a broad band by using one or more carriers. For example, when an each carrier corresponds to a bandwidth of 20 MHz, a bandwidth of a maximum of 100 MHz may be supported by using five carriers.

Meanwhile, frequency division multiplexing (FDD) cells may not be synchronized each other whereas time division multiplexing (TDD) cells may be synchronized when FDD and TDD carriers are aggregated. Thus, it is needed to handle the case that FDD and TDD carriers are aggregated. Similarly, the same issue may occur when TDD carriers are aggregated where synchronization between TDD carriers are not achieved. Another example is a carrier aggregation scenario where a carrier in a licensed band is aggregated with a carrier in unlicensed band where the SFN alignment between two carriers may not be achieved due to carrier sensing and medium access latency in unlicensed band.

SUMMARY OF INVENTION

Technical Problem

An object of the present invention is to provide method and apparatus for performing wireless communication when cells are synchronous.

Another object of the present invention is to provide method and apparatus for adjusting asynchronous transmission under FDD and TDD aggregation in configuration of dual connectivity.

Another object of the present invention is to provide method and apparatus for adjusting asynchronous transmission when SFN boundaries are not synchronized.

Technical Solution

One example of the present application is a method for frequency division duplex (FDD)/time division duplex (TDD) aggregation by an user equipment (UE), the method comprising receiving signals from a cell configured with FDD and/or a cell configured with TDD according to the downlink scheduling, adjusting timing of uplink transmissions for the cells configured with FDD or the cell configured with TDD when the UE detects timing difference between the cells, and transmitting uplink signal to the cell configured and/or a cell configured with TDD based on the adjusted timing.

Yet another example of the present application is a method for frequency division duplex (FDD)/time division duplex (TDD) aggregation by a base station (BS), the method comprising receiving signals from a user equipment (UE) which is configured to receiving and transmitting signals with at least two BS, adjusting timing of transmission for the UE when there is timing difference between the cells which are configured with the UE, and transmitting signal to the UE including information on uplink timing adjustment.

Advantageous Effects

According to the present invention, wireless communication can be performed even there are asynchronous cells.

According to the present invention, asynchronous transmission can be adjusted under FDD and TDD aggregation in configuration of dual connectivity.

According to the present invention, asynchronous transmission can be adjusted when SFN boundaries are not synchronized.

MODE FOR INVENTION

Figure 1:
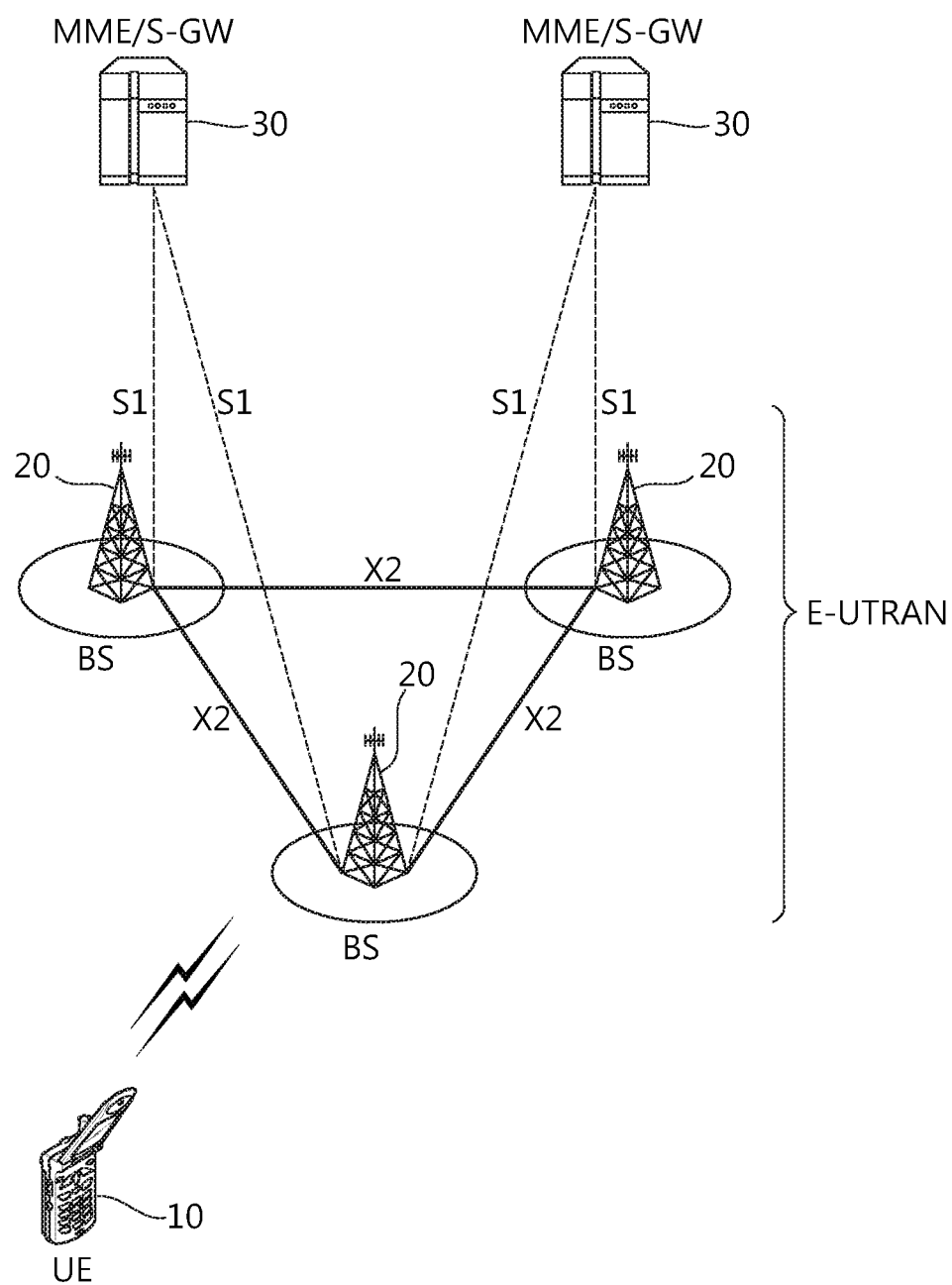
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to an user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, a cell, node-B, or node etc.

Multi-access schemes applied to the wireless communication system are not limited. Namely, various multi-access schemes such as CDMA (Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

More details, radio protocol architecture for a user plane (U-plane) and a control plane (C-plane) are explained. A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface. Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (it may also be referred to as an RRC connected mode), and otherwise the UE is in an RRC idle state (it may also be referred to as an RRC idle mode).

Figure 2:
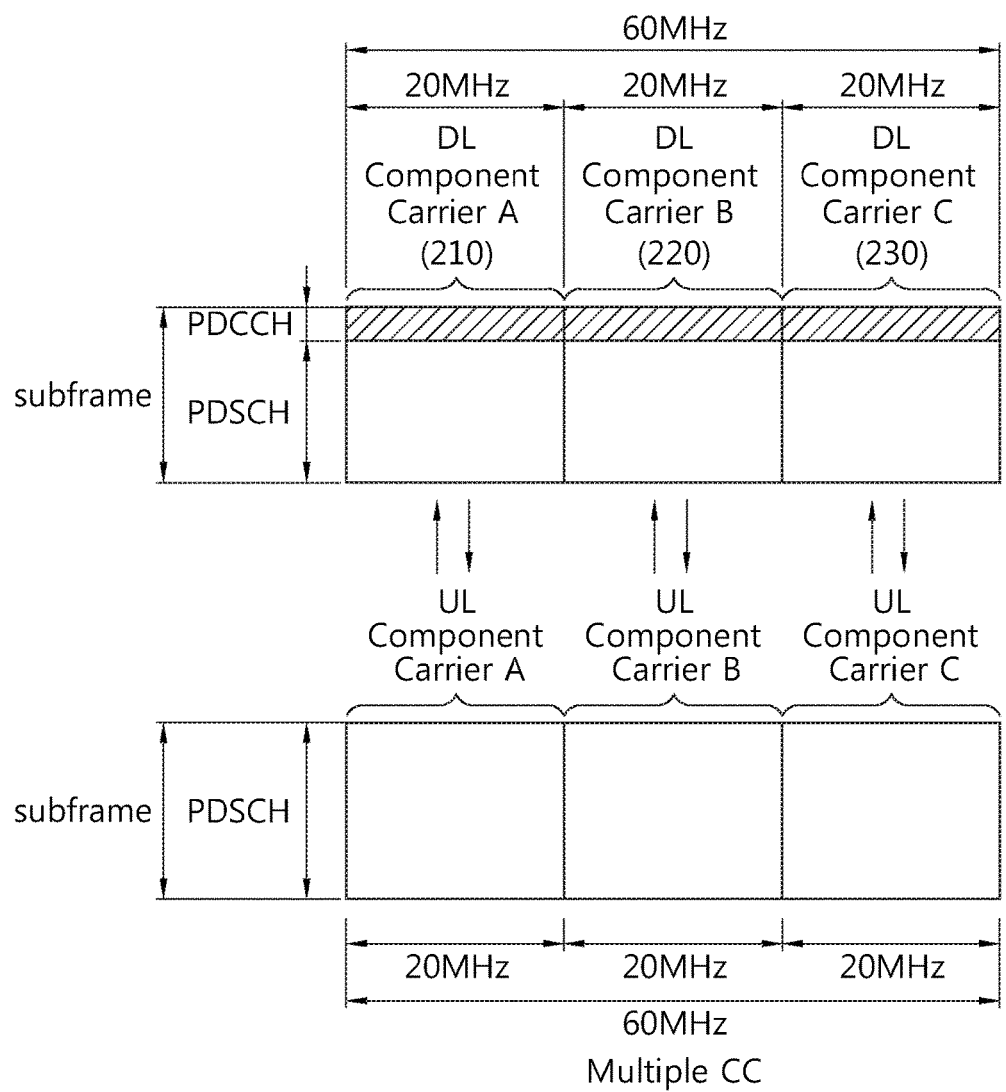
FIG. 2 shows an exemplary concept for a carrier aggregation (CA) technology according to an exemplary embodiment of the present invention.

FIG. 2 shows an exemplary concept for a carrier aggregation (CA) technology according to an exemplary embodiment of the present invention.

Referring to FIG. 2, the downlink (DL)/uplink (UL) subframe structure considered in 3GPP LTE-A (LTE-Advanced) system where multiple CCs are aggregated (in this example, 3 carriers exist) is illustrated, a UE can monitor and receive DL signal/data from multiple DL CCs at the same time. However, even if a cell is managing N DL CCs, the network may configure a UE with M DL CCs, where M≤N so that the UE's monitoring of the DL signal/data is limited to those M DL CCs. In addition, the network may configure L DL CCs as the main DL CCs from which the UE should monitor/receive DL signal/data with a priority, either UE-specifically or cell-specifically, where L≤M≤N. So the UE may support one or more carriers (Carrier 1 or more Carriers 2 . . . N) according to UE's capability thereof.

A Carrier or a cell may be divided into a primary component carrier (PCC) and a secondary component carrier (SCC) depending on whether or not they are activated. A PCC is always activated, and an SCC is activated or deactivated according to particular conditions. That is, a PCell (primary serving cell) is a resource in which the UE initially establishes a connection (or a RRC connection) among several serving cells. The PCell serves as a connection (or RRC connection) for signaling with respect to a plurality of cells (CCs), and is a special CC for managing UE context which is connection information related to the UE. Further, when the PCell (PCC) establishes the connection with the UE and thus is in an RRC connected mode, the PCC always exists in an activation state. A SCell (secondary serving cell) is a resource assigned to the UE other than the PCell (PCC). The SCell is an extended carrier for additional resource assignment, etc., in addition to the PCC, and can be divided into an activation state and a deactivation state. The SCell is initially in the deactivation state. If the SCell is deactivated, it includes not transmit sounding reference signal (SRS) on the SCell, not report CQI/PMI/RI/PTI for the SCell, not transmit on UL-SCH on the SCell, not monitor the PDCCH on the SCell, not monitor the PDCCH for the SCell. The UE receives an Activation/Deactivation MAC control element in this TTI activating or deactivating the SCell.

To enhance the user throughput, it is also considered to allow inter-node resource aggregation over more than one eNB/node where a UE may be configured with more than one carrier groups. It is configured PCell per each carrier group which particularly may not be deactivated. In other words, PCell per each carrier group may maintain its state to active all the time once it is configured to a UE. In that case, serving cell index i corresponding to a PCell in a carrier group which does not include serving cell index 0 which is a master PCell cannot be used for activation/deactivation.

More particularly, if serving cell index 0, 1, 2 are configured by one carrier group whereas serving cell index 3, 4, 5 are configured by the other carrier group in two carrier group scenarios where serving cell index 0 is PCell and serving cell index 3 is the PCell of the second carrier group, then only bits corresponding 1 and 2 are assumed to be valid for the first carrier group cell activation/deactivation messages whereas bits corresponding 4 and 5 are assumed to be valid for the second carrier group cell activation/deactivation. To make some distinction between PCell for the first carrier group and the second carrier group, the PCell for the second carrier group can be noted as S-PCell hereinafter. Herein, the index of the serving cell may be a logical index determined relatively for each UE, or may be a physical index for indicating a cell of a specific frequency band. The CA system supports a non-cross carrier scheduling of self-carrier scheduling, or cross carrier scheduling.

Figure 3:
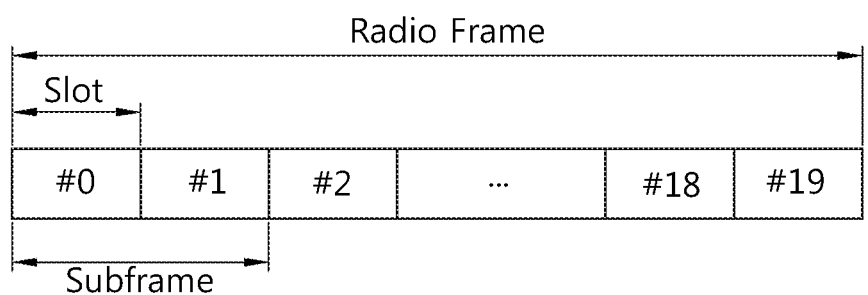
FIG. 3 shows a structure of a radio frame to which the present invention is applied.

FIG. 3 shows a structure of a radio frame to which the present invention is applied.

Referring to FIG. 3, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE system and it may be called an SC-FDMA symbol or a symbol period depending on a multi-access scheme. An RB is a resource allocation unit, and it includes a plurality of contiguous subcarriers in one slot. The number of OFDM symbols included in one slot may vary according to the configuration of the CP (Cyclic Prefix). The CP includes an extended CP and a normal CP. For example, if normal CP case, the OFDM symbol is composed by 7. If configured by the extended CP, it includes 6 OFDM symbols in one slot. If the channel status is unstable such as moving at a fast pace UE, the extended CP can be configured to reduce an inter-symbol interference. Herein, the structure of the radio frame is only illustrative, and the number of subframes included in a radio frame, or the number of slots included in a subframe, and the number of OFDM symbols included in a slot may be changed in various ways to apply new communication system. This invention has no limitation to adapt to other system by varying the specific feature and the embodiment of the invention can apply with changeable manners to a corresponding system.

The downlink slot includes a plurality of OFDM symbols in the time domain. For example, one downlink slot is illustrated as including 7 OFDMA symbols and one Resource Block (RB) is illustrated as including 12 subcarriers in the frequency domain, but not limited thereto. Each element on the resource grid is called a Resource Element (RE). One resource block includes 12×7 (or 6) REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively.

The former 0 or 1 or 2 or 3 OFDM symbols of the first slot within the subframe correspond to a control region to be assigned with a control channel, and the remaining OFDM symbols thereof become a data region to which a physical downlink shared chancel (PDSCH) is allocated. Examples of downlink control channels include a Physical Control Format Indicator Channel (PCFICH), a Physical Downlink Control Channel (PDCCH), and a Physical Hybrid-ARQ Indicator Channel (PHICH).

The PCFICH transmitted in a 1st OFDM symbol of the subframe carries a control format indicator (CFI) regarding the number of OFDM symbols (i.e., a size of the control region) used for transmission of control channels in the subframe, that is, carries information regarding the number of OFDM symbols used for transmission of control channels within the subframe. The UE first receives the CFI on the PCFICH, and thereafter monitors the PDCCH.

The PHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH (or ePDCCH) is a downlink physical channel, a PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCHs may be transmitted within the control region, and a UE can monitor a plurality of PDCCHs. The PDCCH is transmitted on one Control Channel Element (CCE) or on an aggregation of some contiguous CCEs. A CCE is a logical assignment unit for providing a coding rate according to the state of a radio channel to a PDCCH. The CCE corresponds to a plurality of resource element groups (REGs). A format of the PDCCH and the number of bits of the available PDCCH are determined according to a correlation between the number of CCEs and the coding rate provided by the CCEs.

The wireless communication system of the present invention uses blind decoding for Physical Downlink Control Channel (PDCCH) detection. The blind decoding is a scheme in which a desired identifier is de-masked from a CRC of a PDCCH to determine whether the PDCCH is its own channel by performing CRC error checking. An eNB determines a PDCCH format according to a Downlink Control Information (DCI) to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH. For example, if the PDCCH is for a specific UE, a unique identifier (e.g., cell-RNTI (C-RNTI)) of the UE may be masked to the CRC. Alternatively, if the PDCCH is for a paging message, a paging indicator identifier (e.g., paging-RNTI (e.g., P-RNTI)) may be masked to the CRC. If the PDCCH is for system information (more specifically, a system information block (SIB) to be described below), a system information identifier and system information RNTI (e.g., SI-RNTI) may be masked to the CRC. To indicate a random access response that is a response for transmission of a random access preamble of the UE, a random access-RNTI (e.g., RA-RNTI) may be masked to the CRC.

Thus, the BS determines a PDCCH format according to a Downlink Control Information (DCI) to be transmitted to the UE, and attaches a cyclic redundancy check (CRC) to control information. The DCI includes uplink or downlink scheduling information or includes an uplink transmit (Tx) power control command for arbitrary UE groups. The DCI is differently used depending on its format, and it also has a different field that is defined within the DCI.

Meanwhile, an uplink subframe may be divided into a control region to which a physical uplink control channel (PUCCH) that carries uplink control information is allocated; the control information includes an ACK/NACK response of downlink transmission. A data region to which physical uplink shared channel (PUSCH) that carries user data is allocated in the frequency domain.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a channel quality indication (CQI), and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system, and also the FDD system. PUCCH format 3 can be used to enable the possibility of transmitting more than four bits in an efficient way, even though PUCCH format 3 also be used for transmitting less four bits of signal. The basis of PUCCH format 3 is DFT (Discrete Fourier Transform)-precoded OFDM. Up to five terminals may share the same resource-block pair for PUCCH format 3 when a length-5 orthogonal sequence is used with each of the five OFDM symbol carrying data in a slot being multiplied by one element of the sequence. A terminal (eNB and/or UE) can be configured with more than one resource (e.g. four different resources) for PUCCH format 3.

Figure 4:
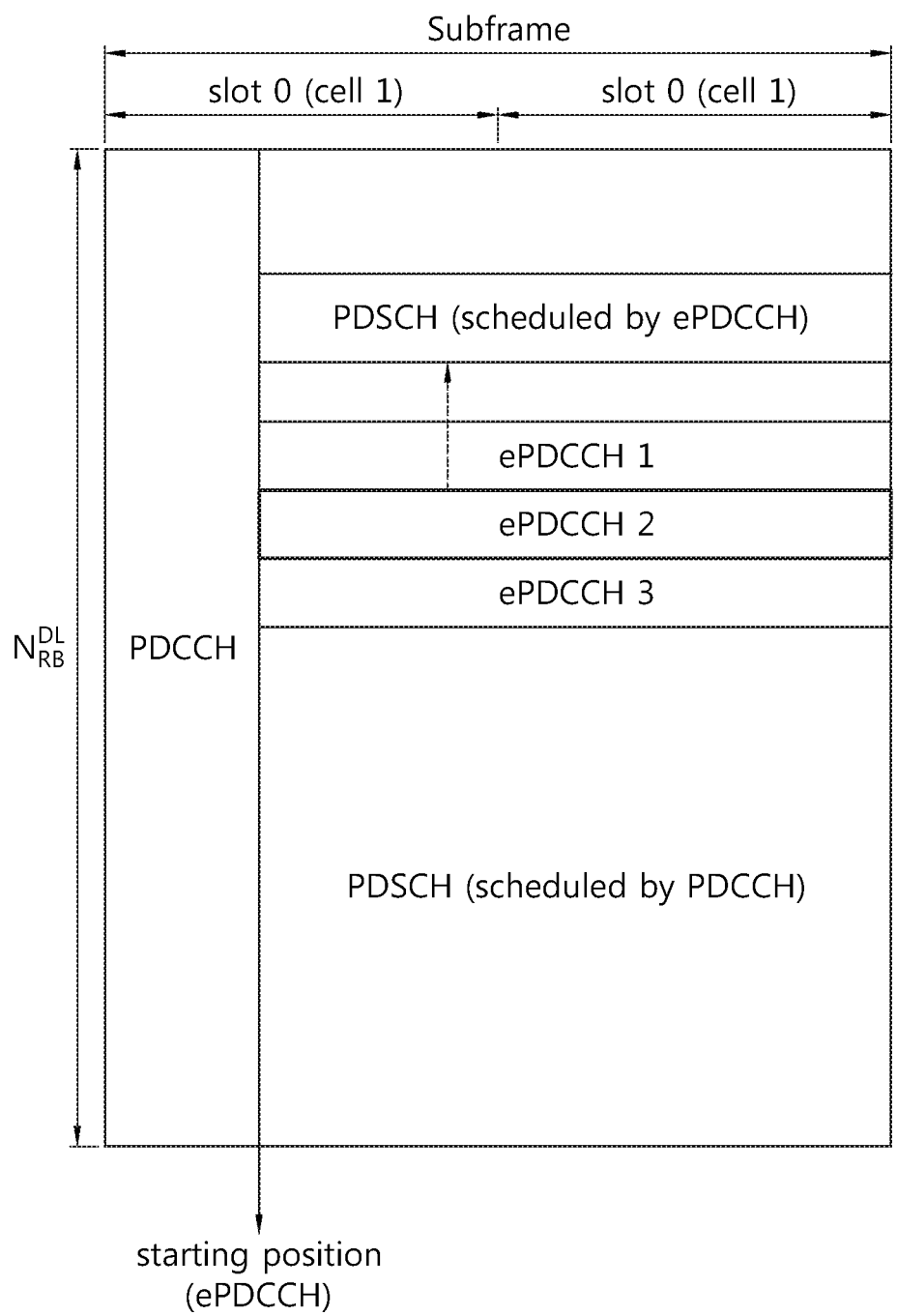
FIG. 4 shows downlink control channels to which the present invention is applied.

Herein, an ePDCCH can be one of solutions of limitation for a PDCCH transmission or new control information transmission of near future communication system including a new type of carrier as shown in FIG. 4.

FIG. 4 shows downlink control channels to which the present invention is applied. The ePDCCH which can be multiplexed with the PDSCH can support multiple Scells of the CA.

Referring to FIG. 4, the UE can monitor a plurality of PDCCH/ePDCCHs within the control region and/or data region. As the PDCCH is transmitted on CCE, ePDCCH can be transmitted on eCCE (enhanced CCE) as an aggregation of some contiguous CCEs, the eCCE corresponds to a plurality of REGs. If ePDCCH is more efficient than PDCCH, it is worthwhile to have subframes where only ePDCCHs are used without PDCCHs. The PDCCHs and new ePDCCH only subframes, or have only ePDCCH only subframes can be in a new type of carrier as NC which has both legacy LTE subframes. It is still assumed that MBSFN subframes exist in a new carrier NC. Whether to use PDCCH in multimedia broadcast single frequency network (MBSFN) subframes in NC and how many ODFM symbols will be allocated if used can be configured via RRC signaling. Further TM10 and new TM mode of UE can be considered for new carrier type as well. Hereafter, new carrier type refers to a carrier where all or part of legacy signals can be omitted or transmitted in different manners. For example, a new carrier may refer a carrier where a cell-specific common reference signal (CRS) may be omitted in some subframes or physical broadcast channel (PBCH) may not be transmitted.

Meanwhile, a UE may receive signals from more than one cell and transmit signals to more than one cell under some circumstances.

Small cells using low power nodes are considered promising to cope with mobile traffic explosion, especially for hotspot deployments in indoor and outdoor scenarios. A low-power node generally means a node whose transmission (Tx) power is lower than macro node and base station (BS) classes, for example a pico and femto eNodeB (eNB) are both applicable.

Dual connectivity is an operation where a given UE consumes radio resources provided by at least two different network points (master eNB (MeNB) and secondary eNB (SeNB)) connected with non-ideal or ideal backhaul while UE is in RRC_CONNECTED mode.

Figure 5:
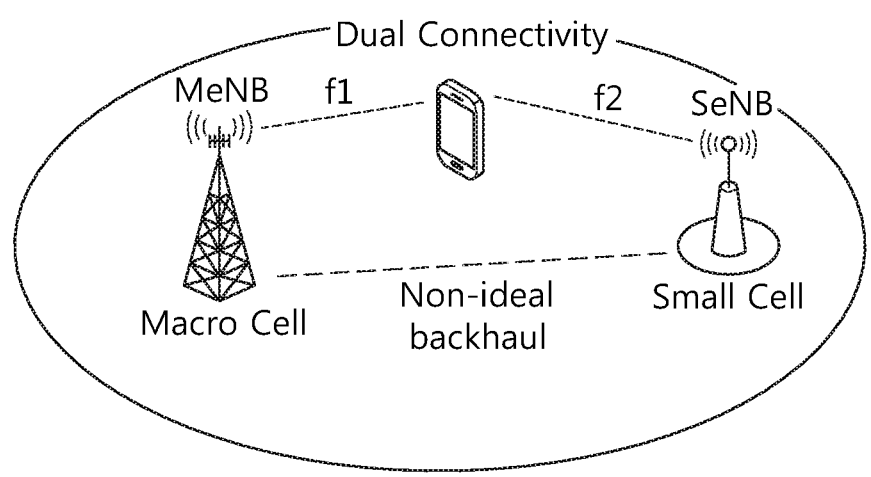
FIG. 5 shows an example of dual connectivity to a macro cell and a small cell.

FIG. 5 shows an example of dual connectivity to a macro cell and a small cell. Referring to FIG. 5, the UE is connected to both the macro cell and the small cell. A macro cell eNB serving the macro cell may be called as a MeNB in dual connectivity, and a small cell eNB serving the small cell may be called as a SeNB in dual connectivity.

The MeNB is an eNB which terminates at least S1-MME and therefore act as mobility anchor towards the core network (CN) in dual connectivity. If a macro eNB exists, the macro eNB may function as the MeNB, generally. The SeNB is an eNB providing additional radio resources for the UE, which is not the MeNB, in dual connectivity. The SeNB may be generally configured for transmitting best effort (BE) type traffic, while the MeNB may be responsible for transmitting other types of traffic such as VoIP, streaming data, or signaling data.

Figure 6:
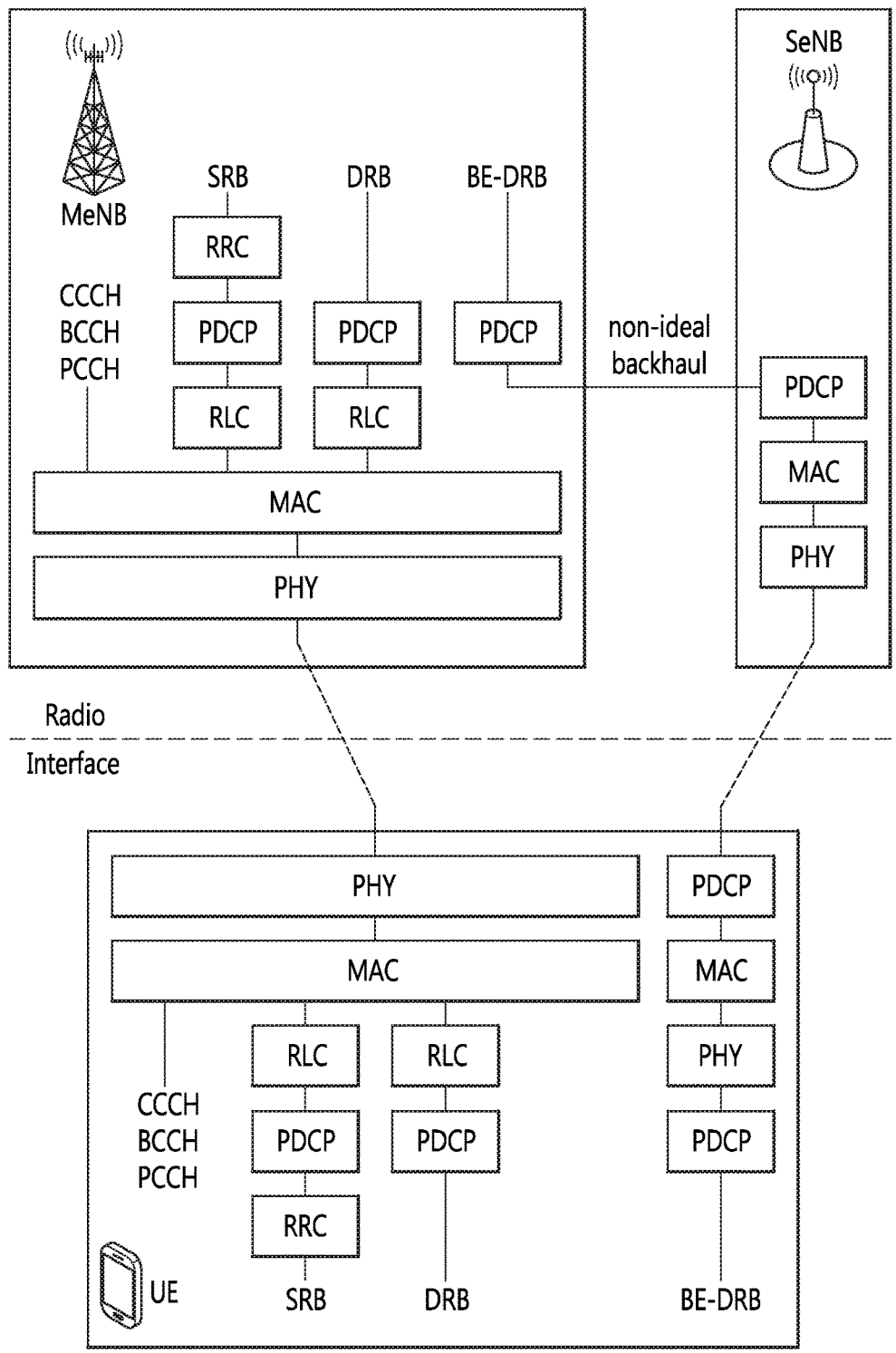
FIG. 6 shows an example of a protocol architecture supporting dual connectivity.

FIG. 6 shows an example of a protocol architecture supporting dual connectivity. To support dual connectivity, various protocol architectures have been studied.

Referring to FIG. 6, PDCP and RLC entities are located in different network nodes, i.e., PDCP entities in the MeNB and RLC entities in the SeNB. In the UE side, the protocol architecture is same as the prior art except that the MAC entity is setup for each eNB (i.e., the MeNB and SeNB).

Meanwhile, when FDD and TDD carriers are aggregated, FDD cells may not be synchronized each other whereas TDD cells may be synchronized. In this case, FDD carrier and TDD carrier may not be synchronized even though two carriers are belonging to the same eNB. Thus, when a UE is configured with multiple CCs which are combined with FDD carriers and TDD carriers belonging to the same eNB, handling of asynchronous FDD and TDD carrier aggregation may be necessary.

Figure 7:
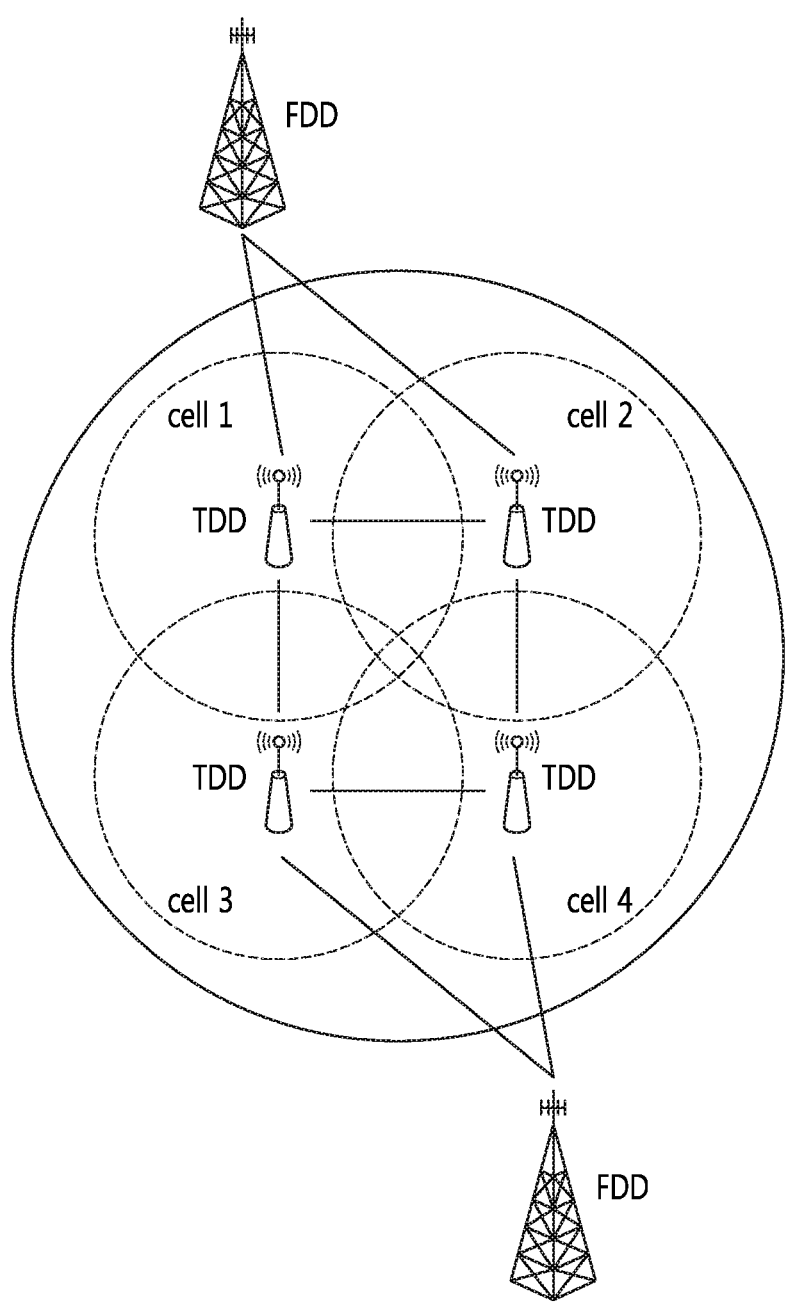
FIG. 7 briefly describes an example of a FDD and TDD asynchronous case.

FIG. 7 briefly describes an example of a FDD and TDD asynchronous case.

In the example of FIG. 7, macro cell uses FDD and small cell uses TDD. Referring to FIG. 7, cell 1 may perform carrier managing, particularly for managing C-Plane of the UE connection including RRC connection and configuration.

In addition, in the case of FIG. 7, it is assumed that two FDD cells are not synchronized each other and TDD cells are synchronized among themselves to handle the interference issue, that is, likely that TDD cell and FDD cell may not be synchronized each other.

Figure 8A:
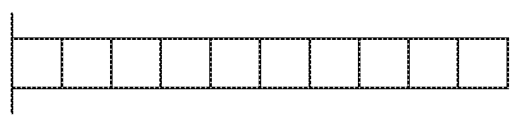
FIG. 8A and FIG. 8B briefly describe synchronization misalignment cases.
Figure 8A:
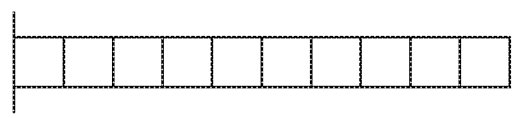
Figure 8A:
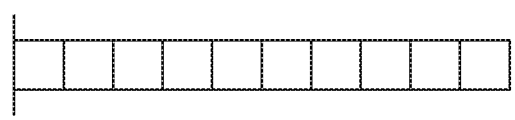
Figure 8A:
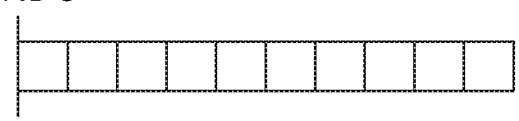
Figure 8A:
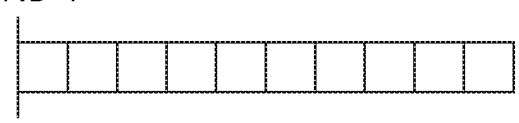
Figure 8A:
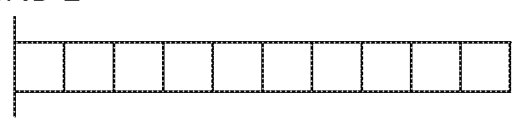
Figure 8B:
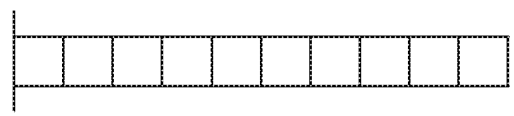
Figure 8B:
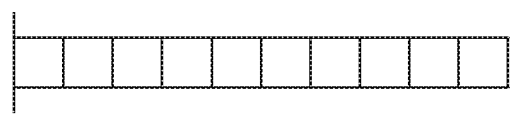
Figure 8B:
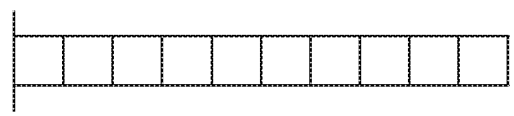
Figure 8B:
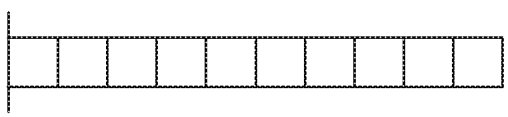
Figure 8B:
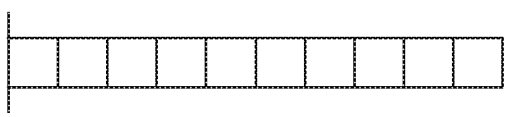
Figure 8B:
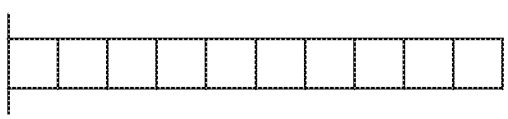

FIG. 8A and FIG. 8B briefly describe synchronization misalignment cases. In FIG. 8A and FIG. 8B, MeNB may be Macro eNB of macro cell and HeNB may be home eNB of home cell or small cell. FIG. 8A describes a case of synchronization within cluster. If TDD cells synchronize each other within a small cell cluster or small cell layer, the timing between TDD cell and FDD cell may not be aligned as shown in FIG. 8A.

FIG. 8B describes a case of synchronization with a macro cell. If TDD cell is synchronized with macro cell, it is likely that TDD cells are not synchronized each other as shown in FIG. 8B.

Assuming a UE is configured with multiple carriers of FDD and TDD (FDD PCell and TDD SCell). When case of FIG. 8A occurs, special handling may be necessary to address asynchronous uplink and downlink transmissions. A similar case occurs when SFN boundaries of PCell and SCell are not aligned. Two approaches for this case are as follows.

APPROACH 1—Separate Uplink Transmission

When a UE is configured with more than one CC which are not synchronized, UE may assume that uplink transmission can be performed for each CC respectively. Alternatively, whether to utilize separate uplink transmission or not can be configured.

If separate uplink transmission is configured by higher layer or UE assumes that behavior based on synchronization among CCs, UE transmits uplink signals such as HARQ-ACK/NACK, uplink control information (UCI), sounding reference signal (SR), physical random access channel (PRACH), etc to each cell respectively. eNB may use PRACCH (i.e. random access preamble) for estimation of the transmission timing of the terminal (i.e. UE).

Timing advance can be configured separately for each CC and cross-carrier scheduling may be disabled (i.e., UE shall assume that mis-configuration occurs when cross-carrier scheduling is configured with asynchronous CCs configured).

Alternatively, cross-carrier scheduling may be applied as a manner of cross-subframe and cross-carrier scheduling. For example, if subframe n schedules cross-carrier scheduling on SCell where the current subframe index is n−2, cross-carrier scheduling may occur in two subframes afterwards.

Alternatively, cross-carrier scheduling is applied to the current subframe which has the larger overlap with the subframe transmitting cross-carrier scheduling DCI. For example, if subframe n of PCell overlaps with subframe n−2 of SCell for more than 500 us, cross-carrier scheduling may apply to subframe n−2 of SCell.

Alternatively, cross-carrier scheduling applies to the latter overlapped subframe. For example, if subframe n−2 and n−1 of SCell overlaps with n subframe of PCell, cross-carrier scheduling in subframe n−1 of SCell is applied.

The timing advance (TA) is an offset between the beginning of received DL subframe and the beginning of transmitted UL subframe from a terminal to eNB.

Generally, TA value is twice of propagation delay from the eNB/transmitter. When subframe-boundary is not aligned as well frame boundary is not aligned, configuring TA per each cell is desired. When the same TA is configured for both carriers (or carrier groups or TA groups), a UE shall apply TA as the configured TA+offset where offset is offset of subframe boundary of the first carrier and the second carrier.

If this approach is used, the techniques for dual connectivity (or inter-site carrier aggregation) can be applicable. In other words, an advanced UE supporting FDD/TDD carrier aggregation can be configured between two options. One option is to transmit uplink following LTE Release-11 carrier aggregation approach with some modification to support FDD/TDD aggregation. The other option is to transmit uplink following dual connectivity or inter-site carrier aggregation approach as if two eNBs are not co-located.

In terms of selecting between two options, either higher layer signaling is used or physical layer signaling (such as DCI) is used or UE autonomously selects the option based on observations and other configurations.

Even though timing and UL transmission follows dual connectivity or inter-site protocol, when FDD/TDD are aggregated over ideal backhaul (i.e., intra-eNB CA), uplink power control follows intra-eNB carrier aggregation approach.

APPROACH 2—Uplink Transmission Timing Alignment

Using this approach, UE may align the uplink transmission timing. In this approach, UE may adjust uplink timing by using large TA.

To allow this, a UE may report offset of received timing difference between two (or more) carriers, and the network may configure the necessary TA value to align the uplink transmission so that the uplink transmission timing difference of signals to each carrier can be bounded within a certain value (e.g., 3 us).

The benefit of this approach is that a UE without supporting multiple TAG can still support uplink transmission. However, to support a large TA for one carrier, downlink reception may be sacrificed in case of TDD, which may be absorbed by gap period.

Figure 9:
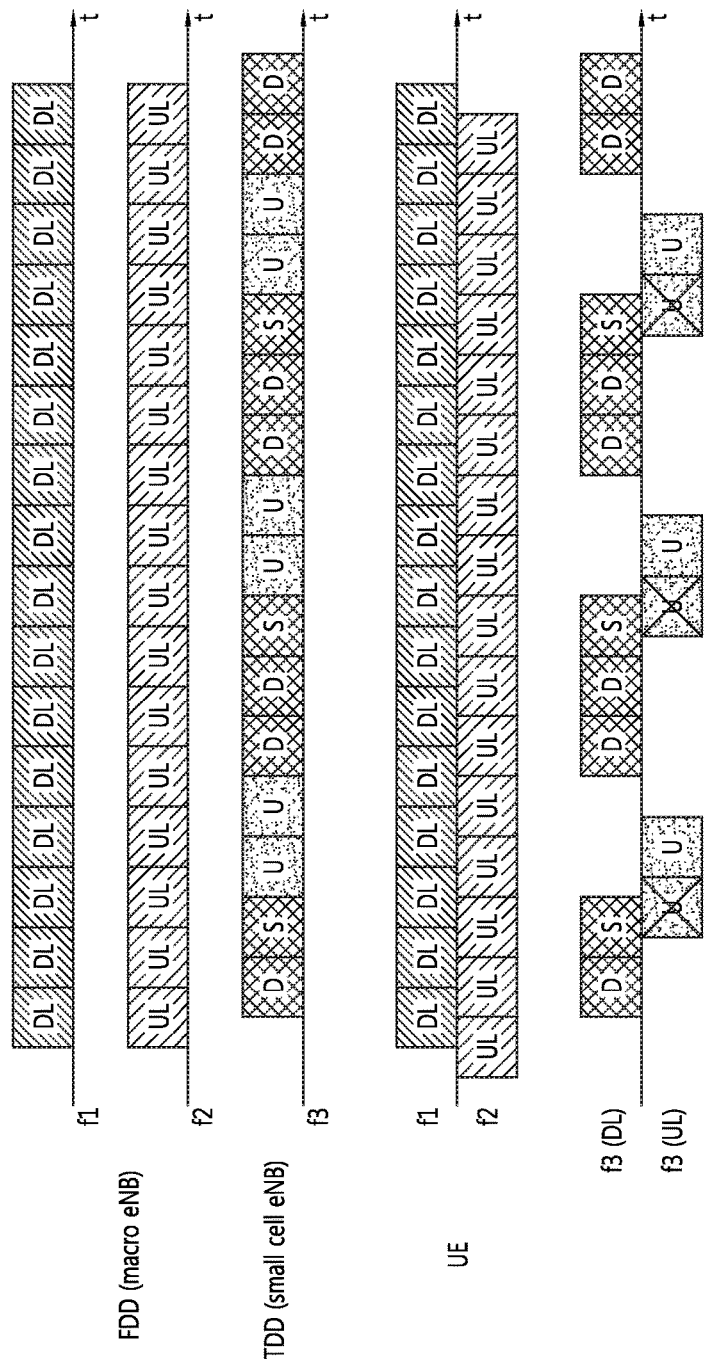
FIG. 9 briefly describes an example of uplink timing adjustment by using large TA according to present invention.

FIG. 9 briefly describes an example of uplink timing adjustment by using large TA according to present invention.

As shown in FIG. 9, the example, a UE can be configured with large uplink timing advance value such that uplink transmission can be aligned with macro cell. While keeping the uplink timing and avoiding potential interference with other downlink transmissions, uplink subframe colliding with downlink transmission will not be used for any uplink transmission. The uplink subframes not used for uplink transmission may be signalled by higher layer or UE may calculate based on its timing.

Also, for uplink part of the special subframe (UpPTS), a UE shall assume that uplink transmission would not be occurred at UpPTS if it collides with downlink transmission. Switching between downlink and uplink occurs in the special subframe, which is split into three parts: a downlink part (DwPTS), a guard period (GP), and an uplink part (UpPTS). The UpPTS can be used for channel sounding or random access.

This approach loses a few uplink subframes, yet, would be a simple approach to support asynchronous FDD and TDD carrier aggregation.

Alternatively, these uplink subframes may be transmitted with lower power or can be used for flexible downlink subframes. To indicate a large uplink TA, random access response (RAR) with 11 bit TA command can be used at SCell activation. eNB may transmit RAR as a response when UE transmit random access preamble on the PRACH.

To support non-ideal backhaul between PCell eNB and SCell eNB, a UE may transmit the time difference between PCell and SCell when transmitting PRACH or via additional signaling. If RAR cannot adjust a large TA value, 6 bit TA command may carry the TA value as well. If a TA value cannot be accommodated by 6 bit TA command, additional bits may be used (e.g., 11 bit TA command) or values may be different to accommodate a large value set. In this case, a UE should be indicated whether current value set is used or a large value set is used.

If a UE detects the time difference, as another approach, a UE may apply the timing advance to PRACH before transmitting PRACH so that the small cell can detect the time difference between macro cell and small cell and configure a proper TA value to align the timing.

For example, if $\Delta$ is a timing difference between two cells, a UE may apply $\Delta$ for timing advance in transmitting PRACH without configured TA command. It requires eNB detects that PRACH transmission may occur, which is not aligned with downlink timing.

In terms of TA calculation, small cell eNB may assume that propagation delay can be ignored such that TA to compensate propagation delay can be assumed as zero. Then, it may configure TA=$\Delta$ to align uplink transmission timing at the UE. This is illustrated in FIG. 10.

Figure 10:
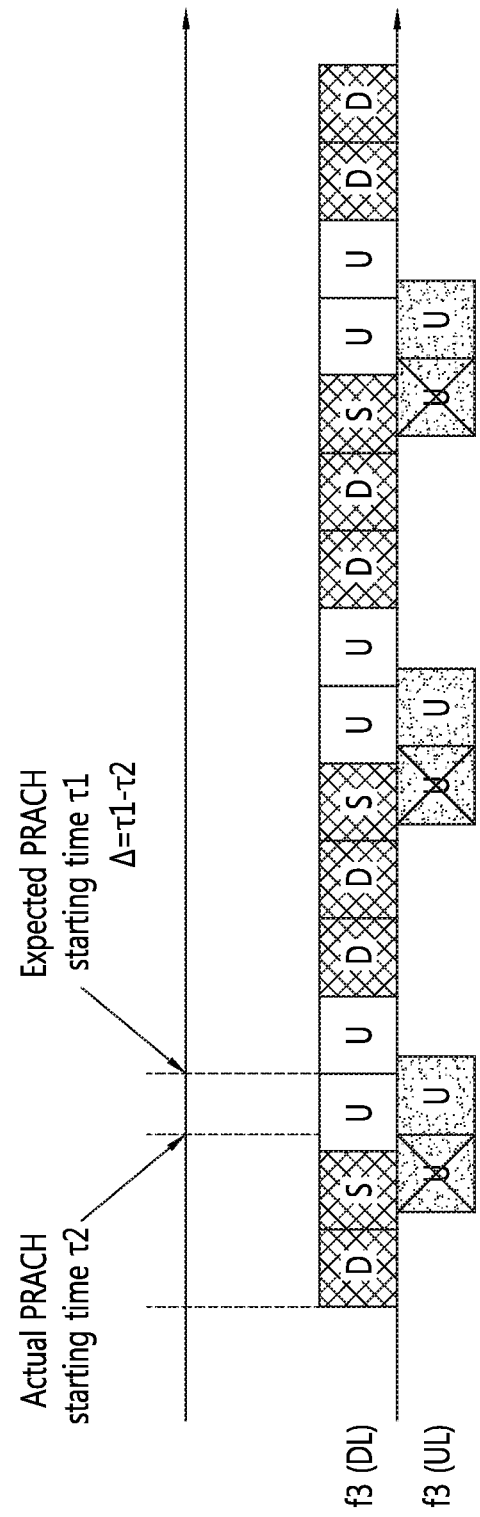
FIG. 10 briefly describes an example of PRACH TA to inform the timing difference between two cells by UE according to present invention.

FIG. 10 briefly describes an example of PRACH TA to inform the timing difference between two cells by UE according to present invention. Referring to FIG. 10, if PRACH does not carry the information on received timing difference between two cells, eNBs should exchange the timing difference by network synchronization or network discovery. If PCell and SCell are intra-eNB, this information can be obtained without explicit signalling or discovery.

APPROACH 3—LTE Release-10 CA-Like Uplink Transmission

Another approach is to utilize carrier-aggregation approach where uplink transmission such as PUCCH is transmitted via PCell only.

Figure 11:
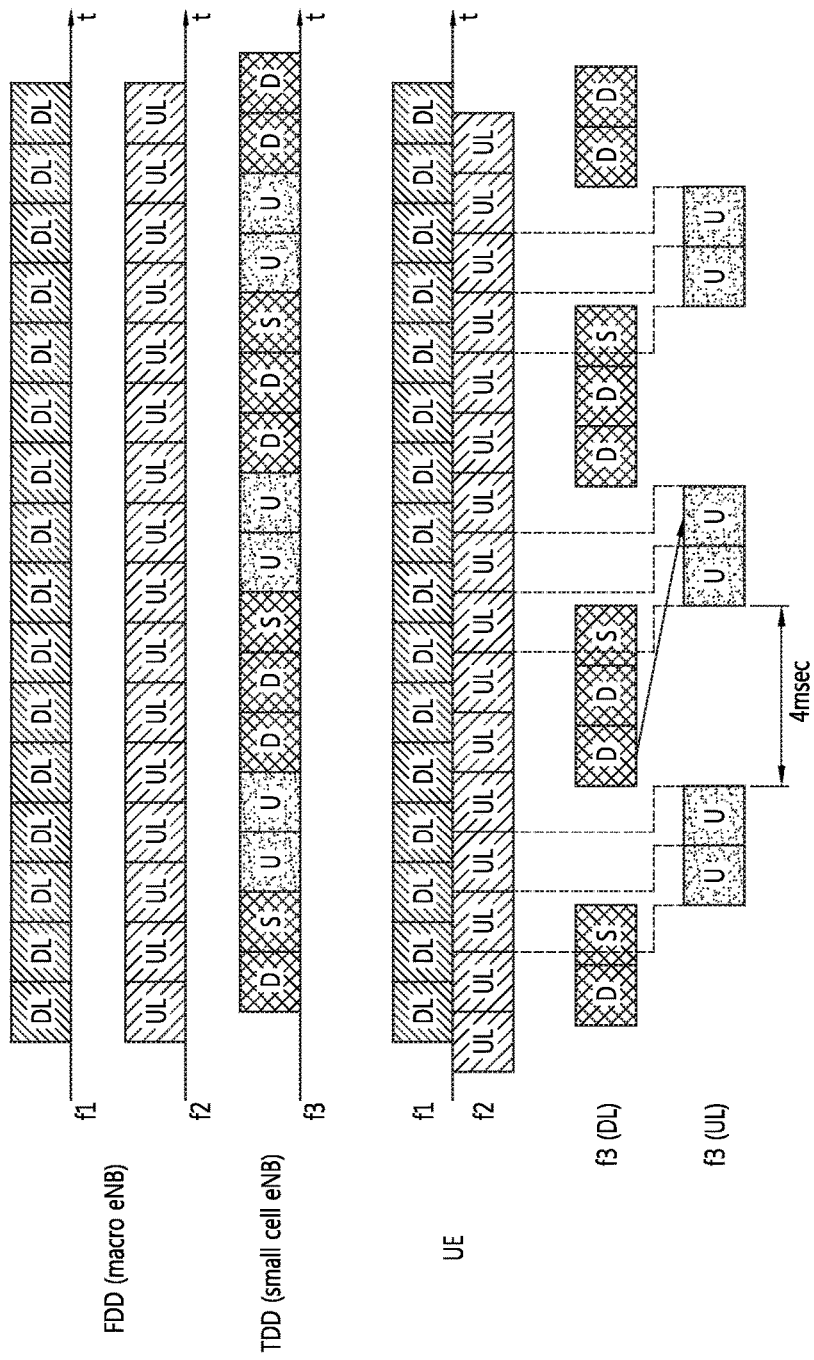
FIG. 11 briefly describes an example of CA-like UL transmission according to the present invention.

FIG. 11 briefly describes an example of CA-like UL transmission according to the present invention. As shown with dotted line in FIG. 11, uplink subframes of PCell and SCell are not aligned. Yet, in terms of HARQ-ACK/NACK timing and other uplink signal timing, it is assume that uplink subframe number within a radio frame of PCell is aligned with uplink subframe number within a radio frame of SCell if single frequency network (SFN) boundary of two cells are aligned. If SFN boundary between two cells is not aligned, offset may be used to tie PCell uplink subframe and SCell uplink subframe index.

As shown in FIG. 11, this approach may need to handle some reference downlink subframe issue or UE decoding capability to handle a case where uplink transmission occurs before 4 msec after downlink data due to mis-alignment between PCell UL and SCell UL.

For example, as shown in FIG. 11, assuming subframe #4 has downlink data whose HARQ-ACK/NACK signal will be transmitted at subframe #8 as indicated by thick arrow. Since HARQ-ACK/NACK signal will be transmitted via PCell, the matching uplink subframe (subframe #8 of FDD UL) will transmit HARQ-ACK/NACK signal for the SCell DL data.

In terms of delay between PDSCH via SCell DL and PUCCH via PCell UL is less than 4 msec due to timing mis-alignment. To avoid this, one candidate approach is to use positive or negative "1 subframe" offset so that SCell UL timing is behind of PCell UL timing.

In the example, positive 1 subframe offset can be used such that PCell UL subframe #9 will be matched with SCell UL subframe #8. To determine a right value of offset, UE may calculate the amount of mis-alignment between two carriers. Either this value or the calculated offset value by the UE will be reported to both serving cells. Or, alternatively, UE may report decoding failure if such a case occurs.

As describe above, it is needed to handle SFN mis-alignment for apply the approaches. From now on, SFN mis-alignment handling For APPROACH 2 and APPROACH 3, when SFN boundary is not aligned, additional handling using offset may be needed.

Figure 12:
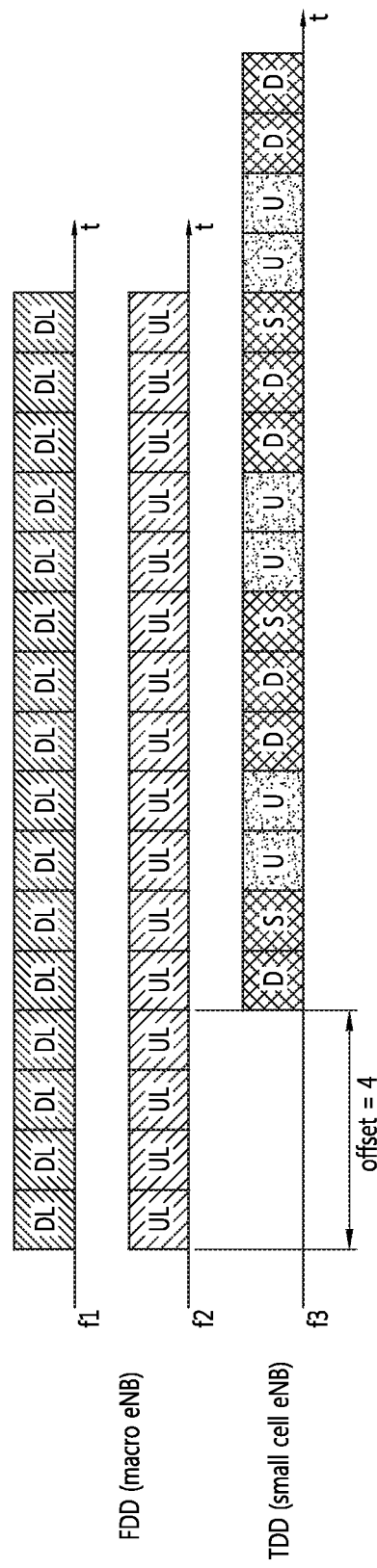
FIG. 12 briefly describes an example of SFN mis-alignment.

FIG. 12 briefly describes an example of SFN mis-alignment. Referring to FIG. 12, let's assume that PCell radio frame boundary and SCell radio frame boundary are mis-aligned with offset=4 subframes.

It may not be a big issue when uplink signal is transmitted to each cell respectively (e.g., using APPROACH 1). However, this issue may need to be handled when APPROACH 2 or APPROACH 3 is used.

One simple way is to add offset to PCell UL subframe index to determine HARQ-ACK timing and other uplink transmission timing. When cross-carrier scheduling is used, offset needs to be considered for downlink scheduling and PHICH as well. For example, HARQ-ACK/NACK for PDSCH transmitted at subframe #0 of SCell DL can be signalled at subframe #(7+offset) of PCell UL (i.e., subframe #11).

For PHICH with cross-carrier scheduling, PHICH timing is also expected at subframe #(n+k+offset) where k is PHICH timing specified in LTE Release-11 CA when uplink transmission occurs in n-th subframe. For CSI feedback transmitted to PCell UL, valid downlink subframe of SCell DL may be subframe #(n-k-offset) where k is the value used in LTE Release-11 CA for reference downlink subframe for CSI feedback.

Similar mechanisms can be applicable to aperiodic CSI, PDCCH order, aperiodic SRS and activation and deactivation of SCell and others where SCell UL timing is determined by PCell DL (or vice versa i.e., PCell UL is determined by SCell DL).

More specifically, let's assume that offset value is o, and a few timing properties are described. If timing alignment is not synchronized, a UE may assume that multiple TA groups (TAGs) are configured. Thus, a UE behavior with multiple TAGs configured can be applicable to this case as well.

(1) Periodic CSI Reporting Using PUCCH:

Handling of CSI for SCell via PCell PUCCH, two ways can be considered.

One way is to configure periodic CSI report for SCell with consideration of offset so that a UE transmits periodic CSI report at the configured subframe (e.g., if a UE transmits CSI report at subframe #5 every radio frame, it will transmit CSI report at subframe #5+offset o of PCell).

Another way is that UE applies offset value aligned to PCell such that CSI reports will be transmitted at the configured subframe index for PCell (e.g., if a UE transmits CSI report at subframe #5 every radio frame, it will transmit CSI report at subframe #5 of PCell i.e., #5-offset of SCell).

If second way is used, wideband CQI will be transmitted as follows. In the case where wideband CQI/PMI reporting may be configured. The reporting instances for wideband CQI/PMI are subframes satisfying MATH 1.

$$(10 \times n_f + \lfloor (n_s - o)/2 \rfloor - N_{OFFSET,CQI}) \bmod (N_{pd}) = 0 \quad \text{<MATH 1>}$$

Where, o is an offset, $n_f$ and $n_s$ is number of resources. Further, $N_{OFFSET,CQI}$ is number of subframes as an offset for channel quality indicator (CQI), and $N_{pd}$ is periodicity of CQI reporting.

(2) Aperiodic Channel State Information (CSI) report: If aperiodic request is transmitted by PCell to trigger Scell PUSCH, FDD/TDD carrier aggregation reference timing table supported for FDD/TDD carrier aggregation can be followed.

The FDD/TDD carrier aggregation reference timing table maps UCI on DL subframe and UL subframe under FDD/TDD carrier aggregation by defining k such that if a UE detects CSI request at subframe n (Pcell), then on subframe n-offset+k UCI will be mapped on the corresponding PUSCH where k follows the mapping table and n is subframe index indicating the subframe at which UCI received. The table 1 is an example of FDD/TDD carrier aggregation reference timing table.

TABLE 1

| | subframe index n | | | | | | | | | | |
|---|---|---|---|---|---|---|---|---|---|---|---|
| | | 1 | | | | | | 6 | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | | 1 | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

The similar approach applies to CSI report requested by RAR where PUSCH followed up on RAR will carry CSI such that on subframe n-offset+$k_{CSI}$ (where $k_{CSI}$ is a k defined for mapping subframe of reference signal and subframe of CSI reporting. For example, $k_{CSI}$ can be determined for PUSCH timing by RAR per 3GPP TS36.213 6.1.1) uplink control information (UCI) will be mapped.

In terms of determining valid downlink subframe, if Pcell triggers aperiodic CSI request to trigger Scell PUSCH, the valid downlink subframe would be n-offset-$n_{CQI\_ref}$ where n is the subframe index where UCI grant is received and $n_{CQI\_ref}$ is i the subframe index where CQI for reference signal is transmitted.

(3) Physical Random Access Channel (PRACH) Timing:

When PDCCH order is triggered by Pcell in subframe n to trigger PRACH on Scell, the UE may, if requested by higher layers, transmit random access preamble in the first subframe n+$k_{PRACH}$-offset,$k_2$≥6, where a PRACH resource is available. Here, $k_{PRACH}$ is a k for PRACH and may be specified by PRACH configuration.

Similarly, for PUSCH transmission triggered by Pcell, offset value may be used to determine the uplink subframe index such that n+k-offset may transmit Scell PUSCH where subframe n transmits UCI grant.

(4) HARQ-ACK/NACK Signaling:

Signaling timing would be determined following mapping table for each serving cell.

Actual transmission of HARQ-ACK/NACK signal corresponding to SCell DL subframe n would be n+k+offset PCell UL subframe if HARQ-ACK is transmitted to PCell.

In case, HARQ-ACK/NACK is piggybacked on SCell PUSCH, e.g., HARQ-ACK/NACK corresponding to PCell DL subframe n may transmitted n+4-offset SCell UL subframe.

(5) Transmission Power Control (TPC) Command:

Similar to PUSCH grant, the timing of TPC command will be adjusted based on offset.

(6) Cross Carrier Scheduling:

If cross-carrier scheduling is used, for PDSCH, PCell n subframe schedules PDSCH of SCell for subframe n-offset.

Figure 13:
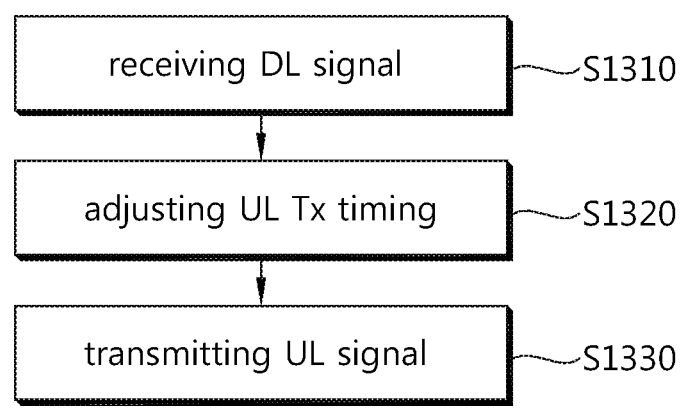
FIG. 13 is a flow chart describing the operation of UE under frequency division duplex (FDD)/time division duplex (TDD) aggregation according to this application.

FIG. 13 is a flow chart describing the operation of UE under frequency division duplex (FDD)/time division duplex (TDD) aggregation according to this application.

Referring to FIG. 13, the UE receiving downlink signal from a cell configured with FDD and/or a cell configured with TDD according to the downlink scheduling at S1310. A primary cell may be a FDD cell configured with the UE and a secondary cell may be a TDD cell configured with the UE. Further, macro cell may be FDD cell and small cell may be TDD cell. Details are same as described above.

Even if TDD cells are synchronized each other, FDD cells may not synchronized and/or TDD cell and FDD cell may not be synchronized each other.

The UE adjusting uplink transmission timing when cells configured with the UE are not synchronized at S1320. The UE may determine whether cells are synchronized or not based on signalling from eNB or detecting signals from cells.

More specifically, if subframe boundary mis-alignment offset changes dynamically (for example SCell frame boundary is changing over time due to channel sensing latency in unlicensed band scenario), the offset may change dynamically. In which case, either a UE dynamically adapts the offset based on the observed received timing difference between carriers or the network may signal the offset via DCI or MAC CE or higher layer signalling.

Overall, to determine the offset, a UE can measure the received timing difference of signals from the first carrier and the second carrier. If there are more than two carriers, the offset between the first and the third carrier is used to determine timing and offset value for the third carrier.

Particularly, the first carrier may be PCell. When the network configures the offset, since the offset accuracy may not be so tight, offset within a subframe misalignment may be computed by the UE regardless of network assistance.

The specific methods of adjusting are described in detail above. For example, the adjustment includes non-use of uplink subframe at which the collision between uplink and downlink can be occurred.

The UE transmits uplink signal based on the adjusted transmission timing at S1330. The uplink signal may include information on timing adjustment. For example, the information may include report on timing difference between cells or report on timing adjustment.

The UE may transmit signal applying timing advance corresponding to timing difference between cells. In addition, UE may apply offset corresponding to timing difference between cells as a timing advance. For example, UE may apply the offset or timing difference as a timing advance for PRACH.

The specific methods of transmission are described in detail above.

Figure 14:
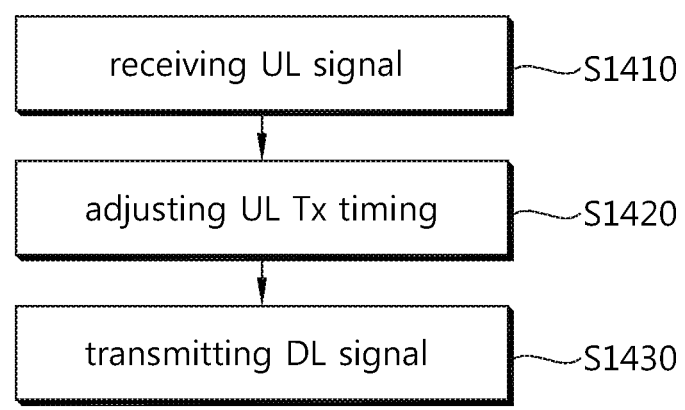
FIG. 14 is a flow chart describing the operation of eNB under frequency division duplex (FDD)/time division duplex (TDD) aggregation according to this application.

FIG. 14 is a flow chart describing the operation of eNB under frequency division duplex (FDD)/time division duplex (TDD) aggregation according to this application.

Referring to FIG. 14, the eNB from an user equipment (UE) which is configured to receiving and transmitting signals with at least two eNB (e.g. cells) at S1410. A primary cell may be a FDD cell configured with the UE and a secondary cell may be a TDD cell configured with the UE. Further, macro cell may be FDD cell and small cell may be TDD cell. The eNB may be MeNB or HeNB. The eNB may be PCell or SCell. That is, one of cells configured with the UE may be a reference cell for timing adjustment. Details are same as described above.

The eNB may be received information on mis-alignment or asychronization between cells via PRACCH. Details also described before.

Even if TDD cells are synchronized each other, FDD cells may not synchronized and/or TDD cell and FDD cell may not be synchronized each other.

The eNB adjusting transmission timing when cells configured with the UE are not synchronized at S1420. The eNB may determine whether cells are synchronized or not based on signalling from a UE or backhaul, etc.

The UE may adjust transmission timing based on the reference cell. Further, the UE may adjust transmission timing based on the specific signals from eNB. The specific methods of adjusting are described in detail above. For example, the adjustment includes scheduling for non-use of uplink subframe at which the collision between uplink and downlink can be occurred.

The eNB transmits downlink signal including information on the adjusted transmission timing at S1430.

For example, the information may include scheduling to synchronize transmission timing, indication of mis-alignment and/or method of adjusting the transmission timing between carriers. The information on method of adjusting the transmission timing between carriers may include information on timing advance, offset between cells, etc.

Figure 15:
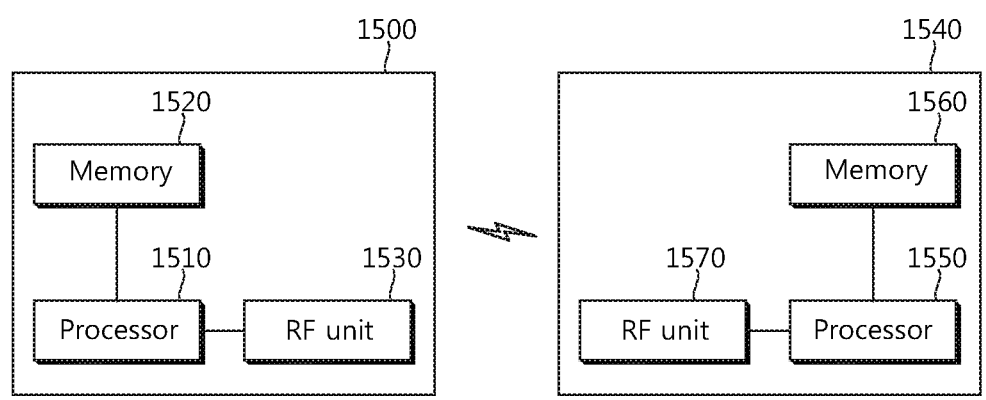
FIG. 15 is a block diagram briefly explaining UE and eNB under frequency division duplex (FDD)/time division duplex (TDD) aggregation according to this application.

FIG. 15 is a block diagram briefly explaining UE and eNB under frequency division duplex (FDD)/time division duplex (TDD) aggregation according to this application.

FIG. 15 is a block diagram which briefly describes an UE 1500 and a BS 1540. The UE 1500 and the BS 1540 may operate based on the description as explained above.

In view of downlink, a transmitter may be a part of the BS 1540 and a receiver may be a part of the UE 1500. In view of uplink, a transmitter may be a part of the UE 1500 and a receiver may be a part of the BS 1540.

Referring to FIG. 15, the UE 1500 may include a processor 1510, a memory 1520 and a radio frequency (RF) unit 1530.

The processor 1510 may be configured to implement proposed procedures and/or methods described in this application. For example, the processor 1510 may detect that cells are asynchronous in transmissions or be informed this by a signal from BS (eNB). In addition, the processor 1510 may adjust timing of transmission and, the processor 1510 may report that cells are asynchronous or information on adjustment of transmission timing. In some cases, information on adjustment of transmission timing may be signaled from BS.

The detailed operations of processor are same as explained in description of FIG. 13.

The memory 1520 is coupled with the processor 1510 and stores a variety of information to operate the processor 1510, which includes data information and/or control information. The RF unit 1530 is also coupled with the processor 1510. The RF unit 1530 may transmit and/or receive a radio signal.

The BS 1540 may include a processor 1550, a memory 1560 and a RF unit 1570. Here, the BS may be PCell or SCell and the BS may be a macro cell or small cell.

The processor 1550 may be configured to implement proposed procedures and/or methods described in this application. For example, the processor 1550 may determine whether cells are synchronized or not based on signalling from a UE or backhaul, etc. The processor 1550 may adjust transmission timing by signalling or backhaul, etc. The specific methods of adjusting by the processor 1550 were described in detail above.

The processor may transmit downlink signal including information on the adjusted transmission timing via RF unit 1570. The information may include scheduling to synchronize transmission timing, indication of mis-alignment and/or method of adjusting the transmission timing between carriers. The information on method of adjusting the transmission timing between carriers may include information on timing advance, offset between cells, etc.

The details are same as described in detail above.

The memory 1560 is coupled with the processor 1550 and stores a variety of information to operate the processor 1550, which includes data information and/or control information. The RF unit 1570 is also coupled with the processor 1550. The RF unit 970 may transmit and/or receive a radio signal.

The UE 1500 and/or the BS 1540 may have single antenna or multiple antennas. The wireless communication system may be called as MIMO system when at least one of the UE 1500 and the BS 1540 has multiple antennas.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, the above-described embodiments include various aspects of examples. Accordingly, the present invention should be construed to include all other alternations, modifications, and changes which fall within the scope of the claims.

In the description regarding the present invention, when it is said that one element is "connected" or "coupled" to the other element, the one element may be directly connected or coupled to the other element, but it should be understood that a third element may exist between the two elements. In contrast, when it is said that one element is "directly connected" or "directly coupled" to the other element, it should be understood that a third element does not exist between the two elements.

What is claimed is:

1. A method for frequency division duplex (FDD)/time division duplex (TDD) aggregation by an user equipment (UE), the method comprising:
    receiving signals from a macro cell configured with FDD and a small cell configured with TDD according to downlink scheduling;
    detecting timing difference between the macro cell and the small cell, based on the received signals from the macro cell and the small cell;
    reporting the timing difference to a network;
    receiving a timing advance (TA) value, which is configured by the network based on the timing difference, for aligning an uplink subframe of the small cell with an uplink subframe of the macro cell, from the network; and
    aligning the uplink subframe of the small cell with the uplink subframe of the macro cell, based on the received TA value,
    wherein the uplink subframe of the small cell colliding with a non-uplink subframe of the small cell is adjusted not to be used, when the uplink subframe of the small cell collides with the non-uplink subframe of the small cell after aligning the uplink subframe of the small cell.

2. The method of claim 1, wherein the uplink subframe of the small cell is adjusted not to be used, by higher layer signaling.

3. The method of claim 1, wherein the TA value is received for transmitting a random access channel.

4. The method of claim 1, wherein the uplink subframe of the small cell is aligned with the uplink subframe of the macro cell, while a non-uplink subframe of the small cell is not adjusted.

5. The method of claim 1, wherein the non-uplink subframe includes at least one of a special subframe or a downlink subframe, and
    wherein the special subframe is a subframe including a downlink pilot time slot (DwPTS), a guard period (GP), and an uplink pilot time slot (UpPTS).

6. The method of claim 1, wherein transmission timing for the small cell is adjusted by an offset corresponding to an amount of subframes with which boundaries of single frequency networks configured with the UE are mis-aligned, and an uplink signal for the small cell is transmitted at the uplink subframe adjusted based on the offset.

7. A method for frequency division duplex (FDD)/time division duplex (TDD) aggregation by a base station (BS), the method comprising:
    receiving timing difference from a user equipment (UE), wherein the UE is configured to receive and transmit signals from a macro cell configured with FDD and a small cell configured with TDD;
    configuring a timing advance (TA) value for aligning an uplink subframe of the small cell with an uplink subframe of the macro cell, based on the received timing difference; and
    transmitting the configured TA value to the UE,
    wherein the uplink subframe of the small cell is aligned with the uplink subframe of the macro cell based on the TA value, and
    wherein the uplink subframe of the small cell colliding with a non-uplink subframe of the small cell is adjusted not to be used, when the uplink subframe of the small cell collides with the non-uplink subframe of the small cell after aligning the uplink subframe of the small cell.

8. The method of claim 7, further comprising:
    transmitting, to the UE, subframe information indicating the uplink subframe of the small cell collided with the non-uplink subframe of the small cell.

9. The method of claim 7, wherein the uplink subframe of the small cell is aligned with the uplink subframe of the macro cell, while a non-uplink subframe of the small cell is not adjusted.

10. The method of claim 7, wherein the timing difference is received from the UE after the UE detects the timing difference between the macro cell and the small cell.

11. The method of claim 7, wherein the non-uplink subframe includes at least one of a special subframe or a downlink subframe, and
    wherein the special subframe is a subframe including a downlink pilot time slot (DwPTS), a guard period (GP), and an uplink pilot time slot (UpPTS).

12. The method of claim 7, wherein transmission timing for the small cell is adjusted by an offset corresponding to the amount of mis-alignment between the macro cell and the small cell.

* * * * *